United States Patent
Zhao et al.

(10) Patent No.: US 12,350,646 B1
(45) Date of Patent: Jul. 8, 2025

(54) $CO_2$ GAS-SOLUBLE SILICON NANOFLUID AND PREPARATION METHOD THEREFOR

(71) Applicants: Southwest Petroleum University, Chengdu (CN); Tianfu Yongxing Laboratory, Chengdu (CN)

(72) Inventors: Jinzhou Zhao, Chengdu (CN); Rui Liu, Chengdu (CN); Bo Zhou, Chengdu (CN); Lan Ren, Chengdu (CN); Huajian Jiang, Chengdu (CN)

(73) Assignees: Southwest Petroleum University, Chengdu (CN); Tianfu Yongxing Laboratory, Chengdu (CN)

( * ) Notice: Subject to any disclaimer, the term of this patent is extended or adjusted under 35 U.S.C. 154(b) by 0 days.

(21) Appl. No.: 19/063,633

(22) Filed: Feb. 26, 2025

(30) Foreign Application Priority Data

Dec. 11, 2024 (CN) .......................... 202411814003.9

(51) Int. Cl.
  *B01J 20/26* (2006.01)
  *B01J 20/28* (2006.01)
  *B01J 20/32* (2006.01)

(52) U.S. Cl.
  CPC ....... *B01J 20/262* (2013.01); *B01J 20/28007* (2013.01); *B01J 20/28016* (2013.01);
  (Continued)

(58) Field of Classification Search
  None
  See application file for complete search history.

(56) References Cited

U.S. PATENT DOCUMENTS 11,692,121 B2 * 7/2023 Xie .................. C09K 8/514
  166/293
2012/0059115 A1 3/2012 Stammer

FOREIGN PATENT DOCUMENTS

CN 102408757 B 4/2012
CN 102786644 A 11/2012
(Continued)

OTHER PUBLICATIONS

CN 11713943 A (Year: 2023).*
(Continued)

*Primary Examiner* — Joseph D Anthony
(74) *Attorney, Agent, or Firm* — Birchwood IP

(57) ABSTRACT

Disclosed are a $CO_2$ gas-soluble silicon nanofluid and a preparation method therefor. The method includes: taking nano-silica and grafting a silane coupling agent to obtain modified nano-silica; taking methylsiloxane, fluorosilicone, aminosiloxane and an end-capping agent, and performing polymerization under the action of a catalyst to obtain a functionalized network siloxane; and taking the modified nano-silica and the functionalized network siloxane, uniformly mixing, then heating for a Michael addition reaction, and obtaining the gas-soluble silicon nanofluid after the reaction is completed. The gas-soluble silicon nanofluid microscopically forms a network structure with modified nano-silica as a cross-linking point and polysiloxane as a chain; macroscopically, the effect of viscosity increase of the supercritical carbon dioxide is significant, and the dissolving pressure is low. The interfacial tension and the miscibility pressure between the crude oil and $CO_2$ are significantly reduced.

7 Claims, 2 Drawing Sheets

(52) U.S. Cl.
CPC ....... *B01J 20/3204* (2013.01); *B01J 20/3219* (2013.01); *B01J 20/3278* (2013.01); *B01J 20/3293* (2013.01)

(56) References Cited

FOREIGN PATENT DOCUMENTS

| | | |
|---|---|---|
| CN | 104312215 B | 1/2015 |
| CN | 106566465 A | 4/2017 |
| CN | 109233160 A | 1/2019 |
| CN | 115197687 B | 10/2022 |
| CN | 115926493 B | 4/2023 |
| CN | 116041651 B | 5/2023 |
| CN | 117362651 A | 1/2024 |
| CN | 118460196 A | 8/2024 |
| DE | 102006018343 A1 | 10/2007 |
| RU | 0002823030 C1 | 7/2024 |

OTHER PUBLICATIONS

Du Daijun etc., "Research status and application progress of branched siloxane and fluorinecontaining polymer thickeners for dry fracturing of carbon dioxide" «Chemical Engineering of Oil & Gas» Aug. 31, 2024 (Aug. 31, 2024), pp. 67-68.

Cao wenhao, Multifunctionalbonding Andperformance Study of Butylphenylpressure Sensitive Adhesives, «Engineering Technology I» , Oct. 23, 2024 (Oct. 23, 2024), p. 29.

\* cited by examiner

$CO_2$ GAS-SOLUBLE SILICON NANOFLUID AND PREPARATION METHOD THEREFOR

CROSS-REFERENCE TO RELATED APPLICATIONS

This application claims priority to Chinese Patent Application No. 202411814003.9, filed on Dec. 11, 2024, which is hereby incorporated by reference in its entirety.

TECHNICAL FIELD

The present application relates to the technical field of additives for oil and gas field development, and specifically to a $CO_2$ gas-soluble silicon nanofluid and a preparation method therefor.

BACKGROUND

At present, traditional crude oil production cannot meet the requirement of economic development, and unconventional oil and gas resources are receiving more and more attention. With the exploration and development of unconventional oil and gas resources, the defects such as huge water resource consumption and serious environmental pollution have gradually emerged. Supercritical carbon dioxide ($SC$-$CO_2$) is considered to be a very promising fracturing fluid and an oil displacement agent. In addition to the characteristics of easy separation, low damage, and easy flowback, the supercritical carbon dioxide has unique oil displacement properties such as dissolution, viscosity reduction and post-pressure energy increase, which make it have great potential in unconventional oil and gas production. However, the supercritical carbon dioxide has a viscosity as low as 0.02 mPa· s, and this viscosity cannot carry a proppant evenly into the formation; consequently, the advantages of the carbon dioxide dry fracturing fluid system cannot be fully used.

Currently, the thickeners for supercritical carbon dioxide are mainly hydrocarbon thickeners, siloxane thickeners, and fluorine-containing thickeners. The hydrocarbon thickeners have high dissolution pressure and often require a large amount of co-solvents; the linear siloxane thickeners have low dissolution pressure but low viscosity increase; and the pure fluorine-containing thickeners have the lowest overall dissolution pressure, but the worst viscosity increase. For example, CN117362651A discloses a poly(urethane-siloxane) polymer and a preparation method therefor, which has a final viscosity that increases by 356 times. However, the preparation method uses chloroplatinic acid catalyst and hydrogen-containing siloxane, and the raw materials are expensive and the reaction stability is poor, which makes it difficult to use on site.

Heavy oil reservoirs are predominant in China. The heavy oil has a relatively high content of polar components such as asphaltene and colloid and a high viscosity, which makes it difficult for $CO_2$ and crude oil systems to mix during $CO_2$ displacement. The minimum miscibility pressure is higher than the formation fracture pressure, which greatly limits $CO_2$ miscible flooding.

For example, CN118460196A discloses a miscibility reducing agent for reducing a minimum miscibility pressure between $CO_2$ and crude oil, a preparation method therefor and an application method thereof. However, during the implementation process, toxic miscibility reducing agents such as benzene and white oil are still required, which limits on-site application.

In recent years, nanomaterials have gradually attracted widespread attention due to unique physical and chemical properties. The nanofluids have more excellent properties due to the following characteristics: the nanoparticles have good and stable dispersity in a motion state, and are not easy to cluster; in addition, the nanoparticles have high surface activity and can be stably adsorbed on the phase interface.

For example, CN115197687A discloses a preparation method for a supercritical carbon dioxide thickening system based on a nanomaterial/modified acrylate-siloxane polymer. After the nanomaterial is added, the original system is improved by 30%, and finally by 291 times. However, the reaction is still an expensive hydrosilation reaction, and the nanomaterial is not grafted onto the polymer, which makes it impossible for large-scale application.

Therefore, it can be seen that the current supercritical carbon dioxide thickener still cannot take into account both cost and viscosity-increasing effect. Meanwhile, the thickener can only be used as a single function, which increases the complexity of subsequent oil field development.

SUMMARY

To solve at least one of the above problems, the present application provides a $CO_2$ gas-soluble silicon nanofluid and a preparation method therefor.

A technical solution of the present application is as follows: a preparation method for a $CO_2$ gas-soluble silicon nanofluid, in parts by mass, including the following steps:
  taking nano-silica and grafting a silane coupling agent to obtain modified nano-silica, wherein the silane coupling agent contains a group capable of undergoing a Michael addition reaction with an amino group;
  taking 3-8 parts of methylsiloxane, 4-9 parts of fluorosilicone, 2-6 parts of aminosiloxane and an end-capping agent, and performing polymerization under the action of a catalyst to obtain a functionalized network siloxane; and
  taking 1-3 parts of the modified nano-silica and 10 parts of the functionalized network siloxane, uniformly mixing, then heating to enable the modified nano-silica and the functionalized network siloxane to undergo a Michael addition reaction, and obtaining the gas-soluble silicon nanofluid after the reaction is completed.

Specifically, in the present application, the modified nano-silica may be prepared by using the existing technology. For example, in the prior art, toluene is used as a dispersant, the reaction temperature is 90° C., and the modified nano-silica is prepared by nano-particles and a silane coupling agent. In other methods, the modified nano-silica is prepared by taking a mixed solution of acetone and water as a dispersant, adding nano-particles and a silane coupling agent, and performing an ultrasonic reaction. These methods are conventional operations in the art and may be applied to the present application.

According to an embodiment of the present application, the nano-silica has a particle size of 10-30 nm. When the particle size of nano-silica is too large, nano-silica is prone to agglomeration and performance degradation.

According to an embodiment of the present application, the silane coupling agent is at least one of Y-methacryloxypropyl trimethoxysilane, methacryloxypropyl triethoxysilane, and methacryloxypropyl dimethylethoxysilane.

According to an embodiment of the present application, the preparation of the modified nano-silica includes the following sub-steps: taking 1-3 parts by mass of nano-silica, adding ethanol, and performing an ultrasonic treatment to uniformly disperse a mixture to obtain a dispersion; adding 1-5 parts by mass of a silane coupling agent into a mixed solution of 1-5% ethanol and water, and dissolving to obtain a solution; and mixing the dispersion with an ethanol aqueous solution, reacting for 3-6 h under a condition of deoxidization at 70-100° C., and after the reaction is completed, separating and purifying to obtain the modified nano-silica.

According to an embodiment of the present application, the catalyst is at least one of sodium hydroxide, potassium hydroxide, tetramethylammonium hydroxide, and potassium trimethylsilanolate; an addition amount of the catalyst is 0.01-0.1% of a total mass of methylsiloxane, fluorosiloxane and aminosiloxane.

According to an embodiment of the present application, the preparation of the functionalized network siloxane includes the following sub-steps: taking methylsiloxane, fluorosilicone, aminosiloxane, an end-capping agent and a catalyst, uniformly mixing, and reacting for 4-8 h under a condition of deoxidization at 80-130° C. to obtain the functionalized network siloxane.

According to an embodiment of the present application, the methylsiloxane is at least one of octamethylcyclotetrasiloxane, dodecamethylcyclohexasiloxane and hexadecethylcyclooctasiloxane, the fluorosilicone is at least one of 1,3,5-trimethyl-1,3,5-tris(3,3,3-trifluoropropyl)cyclotrisiloxane, (3,3,3-trifluoropropyl)trimethoxysilane and 3,3,3-trifluoropropylmethyldimethoxysilane, and the aminosiloxane is at least one of γ-aminopropyltriethoxysilane, γ-diethylenetriaminopropylmethyldimethoxysilane and γ-aminopropylmethyldimethoxysilane; and the end-capping agent is one of decamethyltetrasiloxane, octamethyldiphenyldisiloxane, tetramethyldisiloxane, heptamethyltrisiloxane, octamethyltrisiloxane, pentamethyldisiloxane, hexamethyldisiloxane, hexavinyldisiloxane or hexaphenyldisiloxane, and an addition amount of the end-capping agent is 0.06-0.09 parts by mass.

In particular, the end-capping agent is a common additive in the preparation of polysiloxane, the greater the amount added, the lower the polymerization degree of the polysiloxane and vice versa. Those skilled in the art may add different amounts of the end-capping agent based on an actual requirement.

According to an embodiment of the present application, the Michael addition reaction is performed at 100-140° C. for 4-8 h, then the reaction temperature is increased to 150-160° C. and the temperature is kept for 1-2 h.

In addition, the present application also discloses a $CO_2$ gas-soluble silicon nanofluid prepared by the above method, and this nanofluid can effectively increase the viscosity of supercritical carbon dioxide and reduce the miscibility pressure between carbon dioxide and crude oil.

The present application has the following beneficial effects: the gas-soluble silicon nanofluid is prepared by modifying nano-silica using functionalized network siloxane grafted γ-methacryloxypropyltrimethoxysilane; therefore, microscopically, a network structure is formed with modified nano-silica as "cross-linking" points and polysiloxane as a chain, and macroscopically, the effect of viscosity increase of the supercritical carbon dioxide is significant, and the dissolving pressure is low. The interfacial tension between the crude oil and $CO_2$ is significantly reduced, and the miscibility pressure between $CO_2$ and the crude oil is reduced. The raw materials are cheap and available, and a plurality of selectable monomers are available and have good intersolubility. The reaction condition is mild and controllable, the feeding is convenient and easy, and no additional solvent is required. The product is simple to purify and separate. The reaction route is free of expensive catalysts or other auxiliaries.

DESCRIPTION OF EMBODIMENTS

Figure 1:
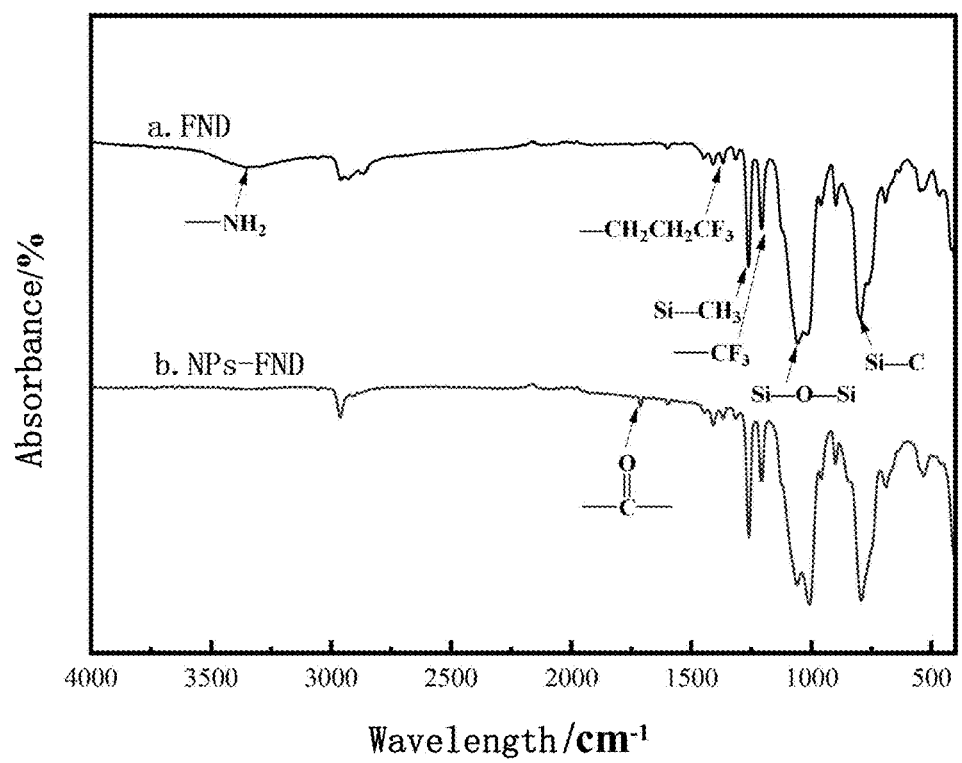
FIG. 1 is a diagram of infrared test results of a product of Example 4.

The specific implementations of the present application will be described clearly and completely below with reference to examples and drawings. It is clear that the described embodiments are merely a part rather than all of embodiments of the present application.

Example 1: Preparation of modified nano-silica: 10 g of silicon dioxide with a particle size of 25 nm was added into a three-necked bottle, then 1000 g of ethanol was added, and a mixture was stirred at room temperature and subjected to ultrasonic treatment to ensure that the nano-silica is dispersed. 20 g of γ-methacryloxypropyltrimethoxysilane was weighed and added into 1000 g of ethanol solution containing 2% deionized water, and a mixture was fully mixed in a beaker, hydrolyzed, cooled to room temperature, and transferred to a three-neck flask. After full mixing, nitrogen was introduced to remove oxygen for 30 min, the grafting reaction was performed for 3.5 h at a temperature of 95° C. in an oil bath, and purification and drying were performed to obtain the modified nano-silica.

Preparation of FND (functionalized network siloxane): 33 g of octamethylcyclotetrasiloxane, 82 g of 1,3,5-trimethyl-1,3,5-tris(3,3,3-trifluoropropyl)cyclotrisiloxane, 25 g of Y-aminopropylmethyldiethoxysilane, 0.804 g of hexamethyldisiloxane and 0.0447 g of tetramethylammonium hydroxide were added into a three-necked bottle, and a mixture was subjected to a ring-opening reaction for 7.5 h in an oil bath at 85° C., and cooled to obtain the FND.

Preparation of NPs-FND ($CO_2$ gas-soluble silicon nanofluid): 10 g of vinyl-terminated nano-silica and 100 g of FND were added into a three-necked bottle and hermetically stirred. The nitrogen was introduced to remove oxygen for 30 min, the grafting reaction was performed at 135° C. in an oil bath for 4.5 h, then the temperature was kept at 150° C. for 2 h, and purification was performed to obtain the NPs-FND.

Example 2: Preparation of modified nano-silica: 20 g of silicon dioxide with a particle size of 15 nm was added into a three-necked bottle, then 1000 g of ethanol was added, and a mixture was stirred at room temperature and subjected to ultrasonic treatment to ensure that the nano-silica is dispersed. 40 g of γ-methacryloxypropyltrimethoxysilane was weighed and added into 1000 g of ethanol solution containing 4% deionized water, and a mixture was fully mixed in a beaker, hydrolyzed, cooled to room temperature, and transferred to a three-neck flask. After full mixing, nitrogen was introduced to remove oxygen for 30 min, the grafting reaction was performed for 5.5 h at a temperature of 75° C. in an oil bath, and purification and drying were performed to obtain the modified nano-silica.

Preparation of FND: 37 g of octamethylcyclotetrasiloxane, 46 g of 1,3,5-trimethyl-1,3,5-tris(3,3,3-trifluoropropyl)cyclotrisiloxane, 40 g of γ-aminopropylmethyldiethoxysilane, 0.653 g of hexamethyldisiloxane and 0.086 g of tetramethylammonium hydroxide were added into a 250 mL three-necked bottle, and a mixture was subjected to a ring-opening reaction for 5.5 h in an oil bath at 105° C., and cooled to obtain the FND.

Preparation of NPs-FND: 20 g of modified nano-silica and 100 g of FND were added into a three-necked bottle and hermetically stirred. The nitrogen was introduced to remove oxygen for 30 min, the grafting reaction was performed at 110° C. in an oil bath for 6.5 h, then the temperature was kept at 150° C. for 1 h, and purification was performed to obtain the NPs-FND.

Example 3: Preparation of modified nano-silica: 15 g of silicon dioxide with a particle size of 25 nm was added into a three-necked bottle, then 1000 g of ethanol was added, and a mixture was stirred at room temperature and subjected to ultrasonic treatment to ensure that the nano-silica is dispersed. 15 g of γ-methacryloxypropyltrimethoxysilane was weighed and added into 500 g of ethanol solution containing 3% deionized water, and a mixture was fully mixed in a beaker, hydrolyzed, cooled to room temperature, and transferred to a three-neck flask. After full mixing, nitrogen was introduced to remove oxygen for 30 min, the grafting reaction was performed for 4.5 h at a temperature of 85° C. in an oil bath, and purification and drying were performed to obtain the modified nano-silica.

Preparation of FND: 74 g of octamethylcyclotetrasiloxane, 46 g of 1,3,5-trimethyl-1,3,5-tris(3,3,3-trifluoropropyl)cyclotrisiloxane, 30 g of γ-aminopropylmethyldiethoxysilane, 0.761 g of hexamethyldisiloxane and 0.075 g of tetramethylammonium hydroxide were added into a three-necked bottle, and a mixture was subjected to a grafting reaction for 4.5 h in an oil bath at 115° C., and cooled to obtain the FND.

Preparation of NPs-FND: 15 g of modified nano-silica and 100 g of FND were added into a three-necked bottle and hermetically stirred. The nitrogen was introduced to remove oxygen for 30 min, the grafting reaction was performed at 120° C. in an oil bath for 5.5 h, then the temperature was kept at 160° C. for 1 h, and purification was performed to obtain the NPs-FND.

Example 4: Preparation of modified nano-silica: 25 g of silicon dioxide with a particle size of 15 nm was added into a three-necked bottle, then 1000 g of ethanol was added, and a mixture was stirred at room temperature and subjected to ultrasonic treatment to en sure that the nano-silica is dispersed. 45 g of γ-methacryloxypropyltrimethoxysilane was weighed and added into 1000 g of ethanol solution containing 5% deionized water, and a mixture was fully mixed in a beaker, hydrolyzed, cooled to room temperature, and transferred to a three-neck flask. After full mixing, nitrogen was introduced to remove oxygen for 30 min, the grafting reaction was performed for 4.5 h at a temperature of 85° C. in an oil bath, and purification and drying were performed to obtain the modified nano-silica.

Preparation of FND: 74 g of octamethylcyclotetrasiloxane, 46 g of 1,3,5-trimethyl-1,3,5-tris(3,3,3-trifluoropropyl)cyclotrisiloxane, 55 g of γ-aminopropylmethyldiethoxysilane, 0.8532 g of hexamethyldisiloxane and 0.153 g of tetramethylammonium hydroxide were added into a three-necked bottle, and a mixture was subjected to a grafting reaction for 4 h in an oil bath at 125° C., and cooled to obtain the FND.

Preparation of NPs-FND: 25 g of modified nano-silica and 100 g of FND were added into a three-necked bottle and hermetically stirred. The nitrogen was introduced to remove oxygen for 30 min, the grafting reaction was performed at 105° C. in an oil bath for 7.5 h, then the temperature was kept at 150° C. for 2 h, and purification was performed to obtain the NPs-FND.

Comparative Example 1

74 g of octamethylcyclotetrasiloxane, 46 g of 1,3,5-trimethyl-1,3,5-tris(3,3,3-trifluoropropyl)cyclotrisiloxane, 38 g of γ-aminopropylmethyldiethoxysilane, 0.828 g of hexamethyldisiloxane and 0.0258 g of tetramethylammonium hydroxide were added into a three-necked bottle, and a mixture was subjected to a ring-opening reaction for 6 h in an oil bath at 100° C., the temperature was kept at 160° C. for 1 h, and the mixture was cooled to obtain the FND.

Comparative Example 2

74 g of octamethylcyclotetrasiloxane, 46 g of 1,3,5-trimethyl-1,3,5-tris(3,3,3-trifluoropropyl)cyclotrisiloxane, 38 g of γ-aminopropylmethyldiethoxysilane, 0.828 g of hexamethyldisiloxane and 0.0258 g of tetramethylammonium hydroxide were added into a three-necked bottle, and a mixture was subjected to a ring-opening reaction for 4 h in an oil bath at 120° C., the temperature was kept at 150° C. for 2 h, and the mixture was cooled to obtain the FND.

Preparation of NPs/FND: 20 g of unmodified nano-silica with a particle size of 20 nm and 100 g of FND were added into a three-necked bottle and hermetically stirred, nitrogen was introduced to remove oxygen for 30 min, the temperature was kept at 100° C. in an oil bath for 6 h, and the NPs/FND is obtained.

To further illustrate the specific performance of the product obtained in the examples of the present application, the product is tested below.

1. Characterization

The FND and NPs-FND of Example 4 were subjected to infrared testing, and the final results are shown in FIG. 1, wherein line a in FIG. 1 represents the infrared test result of FND, and line b in FIG. 1 represents the infrared test result of NPs-FND.

As shown in the line a of FIG. 1, the absorption peaks at 3350 cm-1 and 1597 cm-1 correspond to the stretching and bending vibrations of —NH2, respectively; the absorption peak at 2960 cm-1 corresponds to the stretching vibration of the C—H in the —CH3; the absorption peak at 1408 cm-1 corresponds to the bending vibration of the —CH3; the absorption peak at 1368 cm-1 corresponds to —CH2CH2CF3; the absorption peak at 1315 cm-1 corresponds to CH2-CH2; the absorption peak at 1260 cm-1 corresponds to the stretching vibration of the Si—CH3; the absorption peak at 1210 cm-1 corresponds to —CF3; the absorption peaks at 960 cm-1 and 898 cm-1 correspond to the stretching vibration of C—C; the absorption peaks at 1058 cm-1 and 1023 cm-1 correspond to the stretching vibration of Si—O—Si; and the absorption peaks at 1260 cm-1, 865 cm-1 and 803 cm-1 correspond to the characteristics of Si—C. The infrared results show that the fluorine-containing methylsiloxane polymer is successful.

As shown in the line b of FIG. 1, the absorption peak of —NH2 disappears and the absorption peak of the carbonyl in γ-methacryloxypropyltrimethoxysilane appears. The infrared results show that the modification of nano-silica grafted with fluorinated polysiloxane is successful.

Figure 2:
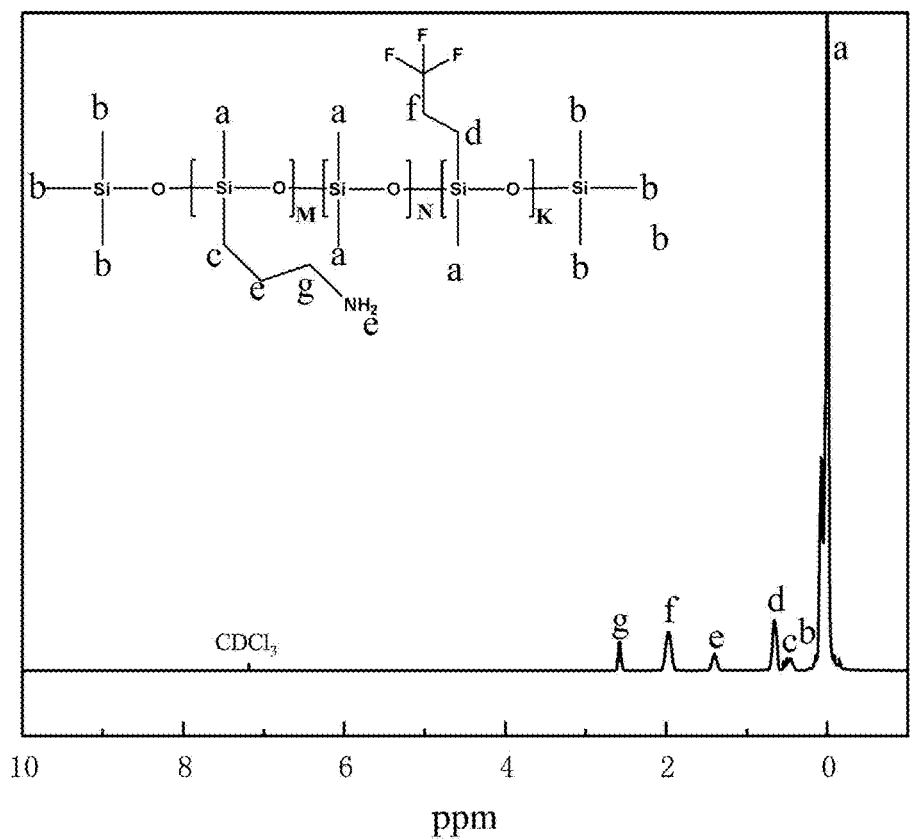
FIG. 2 is a diagram of one-dimensional H-NMR spectrum test results of a product FND of Example 4.
Figure 3:
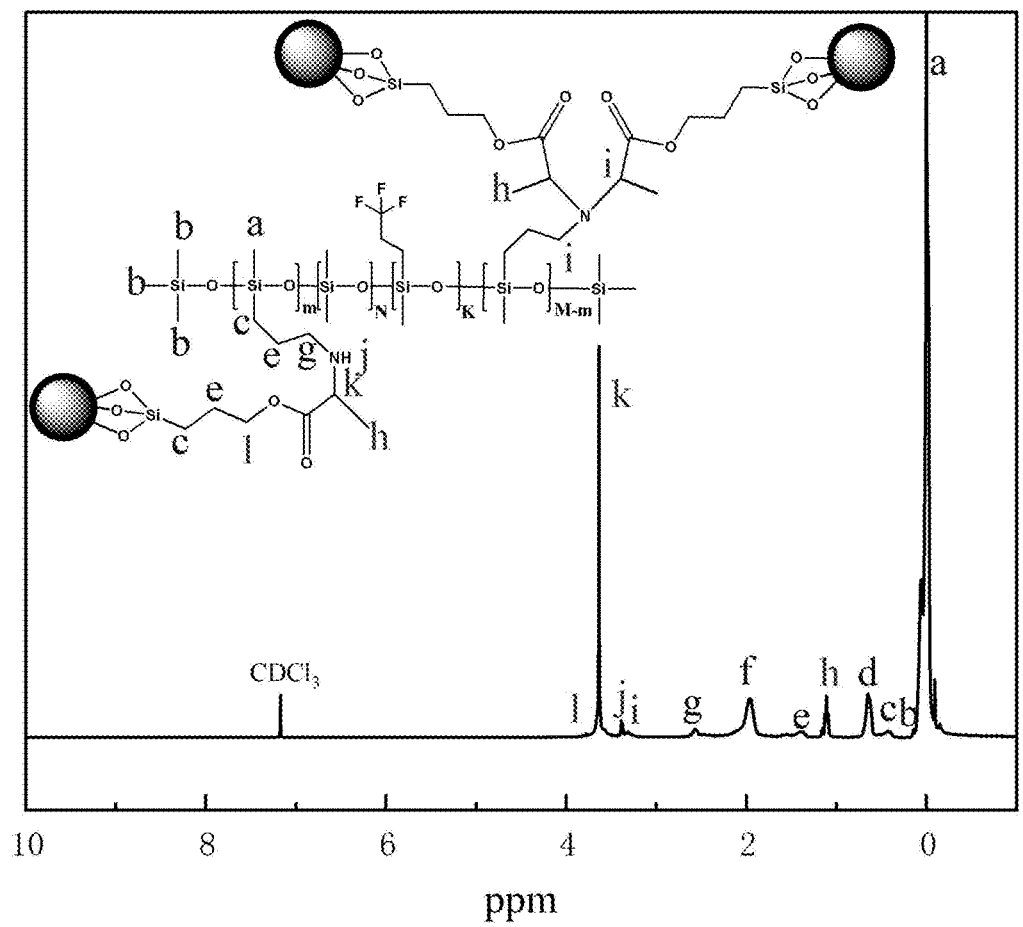
FIG. 3 is a diagram of one-dimensional H-NMR spectrum test results of a product NPs-FND of Example 4.

The FND and NPs-FND obtained in Example 4 were subjected to one-dimensional H-NMR spectrum testing, and the final results are shown in FIGS. 2 and 3.

It can be seen from FIG. 2 that the large peak at 0.04 ppm is attributed to the protons associated with the methyl group connected to the silicon atom; the peak 0.51 ppm represents the protons of the terminal CH3-Si; the peaks at 2.57, 1.48 and 1.07 ppm represent the propyl structure; the peak at 1.07 ppm represents the amino group; and the peak at 2.03 ppm represents the proton peak of —CH2 directly connected to —CF3.

It can be seen from FIG. 3 that the protons at 1.18, 3.38, 3.78 ppm and the like represent the protons related to the methyl, methylene and methyne groups on the γ-methacryloxypropyltrimethoxysilane moiety, which indicates that the modification of nano-silica grafted with fluorinated polysiloxane is successful.

2. Thickening Performance

NPs-FND of Examples 1 to 4, FND of Comparative Example 1 and NPs/FND of Comparative Example 2 were taken and added into a high-temperature and high-pressure visual dissolution kettle at a dosage of 3 wt %. The kettle temperature was set to 40° C., carbon dioxide was injected until the system pressure reached 10 MPa, and stirring was started. After the fluid in the kettle was stable, the viscosity of the fluid was tested with a PAC rotational viscometer. The fluid was compared with pure supercritical carbon dioxide to obtain the viscosity increase multiple, wherein the shearing rate was 170 s-1. The final measured viscosity increase effect is shown in Table 1.

TABLE 1

Viscosity increase multiples of NPs-FND, FND and NPs/FND for supercritical carbon dioxide

| Sample numbers | Viscosity ratio (times) |
| --- | --- |
| NPs-FND of Example 1 | 260 |
| NPs-FND of Example 2 | 315 |
| NPs-FND of Example 3 | 305 |
| NPs-FND of Example 4 | 360 |
| FND of Comparative Example 1 | 157 |
| NPs/FND of Comparative Example 2 | 198 |

It can be seen from Table 1 that the silicon nanofluid prepared in the examples of the present application has a good viscosity increasing effect, which can be up to 360 times.

3. Miscibility Pressure

A relationship curve between pressure and interfacial tension was obtained using a high-temperature and high-pressure interfacial tension meter. According to the experiment, the measured oil-gas interfacial tension and pressure are linearly related. The pressure at which the interfacial tension is 0 after linear extrapolation is the minimum miscibility pressure of crude oil after adding the miscibility reducing agent measured by the interfacial tension method.

At a temperature of 80° C., the minimum miscibility pressure between pure $CO_2$ and the crude oil is first measured using a high-temperature and high-pressure interfacial tension meter. 3.0% of the products of Examples 1~4 and Comparative Examples 1-2 were taken and shaken evenly with dehydrated crude oil, and placed in a thermostatic chamber at 80° C. for more than 12 h, and the minimum miscibility pressure was measured using a high-temperature and high-pressure interfacial tension meter. The final measured results are shown in Table 2.

TABLE 2

Reduction of miscibility pressure between carbon dioxide and crude oil by NPs-FND, FND and NPs/FND

| Sample numbers | Reduction |
| --- | --- |
| NPs-FND of Example 1 | 9.8% |
| NPs-FND of Example 2 | 11.5% |
| NPs-FND of Example 3 | 10.4% |
| NPs-FND of Example 4 | 12.6% |
| FND of Comparative Example 1 | 8.2% |
| NPs/FND of Comparative Example 2 | 9.6% |

It can be seen from Table 2 that the silicon nanofluid prepared by the examples of the present application can significantly reduce the miscibility pressure between carbon dioxide and crude oil by up to 12.6%.

In conclusion, the silicon nanofluid prepared by the examples of the present application can thicken supercritical carbon dioxide, can significantly reduce the miscibility pressure between carbon dioxide and crude oil, is used for multiple purposes, and has high application value.

The above descriptions are only preferred embodiments of the present application, and are not intended to limit the present application in any form. Although the preferred embodiments above have disclosed the present application, they are not intended to limit the present application. Any of those familiar with the technical field, without departing from the scope of the technical solutions of the present application, can use the technical content disclosed above to make various changes and modify the technical content as equivalent changes of the equivalent embodiments. However, any simple modifications, equivalent changes and modifications made to the above embodiments according to the technical spirit of the present application without departing from the content of the technical solutions of the present application shall fall within the scope of the technical solutions of the present application.

What is claimed is:

1. A preparation method for a $CO_2$ gas-soluble silicon nanofluid, in parts by mass, comprising the following steps:
    taking nano-silica and grafting a silane coupling agent to obtain modified nano-silica, wherein the silane coupling agent contains a group capable of undergoing a Michael addition reaction with an amino group;
    taking 3-8 parts of methylsiloxane, 4-9 parts of fluorosilicone, 2-6 parts of aminosiloxane and an end-capping agent, and performing polymerization under the action of a catalyst to obtain a functionalized network siloxane; wherein the catalyst is at least one of sodium hydroxide, potassium hydroxide, tetramethylammonium hydroxide, and potassium trimethylsilanolate; an addition amount of the catalyst is 0.01-0.1% of a total mass of methylsiloxane, fluorosiloxane and aminosiloxane; and
    taking 1-3 parts of the modified nano-silica and 10 parts of the functionalized network siloxane, uniformly mixing, then heating to enable the modified nano-silica and the functionalized network siloxane to undergo a Michael addition reaction, and obtaining the gas-soluble silicon nanofluid after the reaction is completed.

2. The method according to claim 1, wherein the nano-silica has a particle size of 10-30 nm.

3. The method according to claim 1, wherein the silane coupling agent is at least one of γ-methacryloxypropyl trimethoxysilane, methacryloxypropyl triethoxysilane, and methacryloxypropyl dimethylethoxysilane.

4. The method according to claim 1, wherein a preparation of the modified nano-silica comprises the following sub-steps: taking 1-3 parts by mass of nano-silica, adding ethanol, and performing an ultrasonic treatment to uniformly disperse a mixture to obtain a dispersion; adding 1-5 parts by mass of a silane coupling agent into a mixed solution of 1-5% ethanol and water, and dissolving to obtain a solution; and mixing the dispersion with an ethanol aqueous solution, reacting for 3-6 h under a condition of deoxidization at 70-100° C., and after the reaction is completed, separating and purifying to obtain the modified nano-silica.

5. The method according to claim 1, wherein a preparation of the functionalized network siloxane comprises the following sub-steps: taking methylsiloxane, fluorosilicone, aminosiloxane, an end-capping agent and a catalyst, uniformly mixing, and reacting for 4-8 h under a condition of deoxidization at 80-130° C. to obtain the functionalized network siloxane.

6. The method according to claim 1, wherein the methylsiloxane is at least one of octamethylcyclotetrasiloxane, dodecamethylcyclohexasiloxane and hexadecethylcyclooctasiloxane, the fluorosilicone is at least one of 1,3,5-trimethyl-1,3,5-tris(3,3,3-trifluoropropyl)cyclotrisiloxane, (3,3,3-trifluoropropyl)trimethoxysilane and 3,3,3-trifluoropropylmethyldimethoxysilane, and the aminosiloxane is at least one of γ-aminopropyltriethoxysilane, γ-diethylenetriaminopropylmethyldimethoxysilane and γ-aminopropylmethyldimethoxysilane; and end-capping agent one of decamethyltetrasiloxane, octamethyldiphenyldisiloxane, tetramethyldisiloxane, heptamethyltrisiloxane, octamethyltrisiloxane, pentamethyldisiloxane, hexamethyldisiloxane, hexavinyldisiloxane or hexaphenyldisiloxane, and an addition amount of the end-capping agent is 0.06-0.09 parts by mass.

7. The method according to claim 1, wherein the Michael addition reaction is performed at 100-140° C. for 4-8 h, then the reaction temperature is increased to 150-160° C., and the temperature is kept for 1-2 h.

\* \* \* \* \*